United States Patent [19]

Fung

[11] Patent Number: 5,672,551
[45] Date of Patent: Sep. 30, 1997

[54] METHOD FOR MANUFACTURING A SEMICONDUCTOR PRESSURE SENSOR WITH SINGLE-CRYSTAL SILICON DIAPHRAGM AND SINGLE-CRYSTAL GAGE ELEMENTS

[75] Inventor: Clifford D. Fung, Mansfield, Mass.

[73] Assignee: The Foxboro Company, Foxboro, Mass.

[21] Appl. No.: 462,176

[22] Filed: Jun. 5, 1995

Related U.S. Application Data

[62] Division of Ser. No. 210,041, Mar. 18, 1994, abandoned.

[51] Int. Cl.$^6$ ............................................. H01L 21/77
[52] U.S. Cl. ................................ 437/228 SEN; 437/901; 437/921; 437/60; 437/24; 148/DIG. 136
[58] Field of Search .............................. 437/60, 901, 7, 437/228 SEN, 974, 24, 239; 148/DIG. 136

[56] References Cited

U.S. PATENT DOCUMENTS

| | | | |
|---|---|---|---|
| 3,930,823 | 1/1976 | Kurtz et al. | 257/415 |
| 3,938,175 | 2/1976 | Jaffe et al. | 257/419 |
| 4,456,901 | 6/1984 | Kurtz et al. | 338/4 |
| 4,510,671 | 4/1985 | Kurtz et al. | 437/7 |
| 4,618,397 | 10/1986 | Shimizu et al. | 437/7 |
| 4,670,969 | 6/1987 | Yamada et al. | 257/419 |
| 4,672,354 | 6/1987 | Kurtz et al. | 338/4 |
| 4,970,487 | 11/1990 | Tsukahara et al. | 338/5 |
| 4,994,781 | 2/1991 | Sahagen | 338/47 |
| 5,074,152 | 12/1991 | Ellner et al. | 73/766 |
| 5,088,329 | 2/1992 | Sahagen | 73/727 |
| 5,095,349 | 3/1992 | Fujii et al. | 257/419 |
| 5,095,401 | 3/1992 | Zavracky et al. | 437/51 |
| 5,332,469 | 7/1994 | Mastrangelo | 473/228 SEN |
| 5,336,918 | 8/1994 | Ipposhi et al. | 257/419 |

FOREIGN PATENT DOCUMENTS

| | | | |
|---|---|---|---|
| 0 340 904 | 11/1989 | European Pat. Off. . | |
| 0 506 491 | 9/1992 | European Pat. Off. . | |
| 60-97677 | 5/1985 | Japan | 257/419 |
| 60-80281 | 5/1985 | Japan | 257/419 |
| 61-166082 | 7/1986 | Japan | 257/419 |
| 1-239882 | 9/1989 | Japan | 257/417 |
| 1-302773 | 12/1989 | Japan | 257/419 |
| 2-100372 | 4/1990 | Japan | 257/419 |
| 2-237166 | 9/1990 | Japan | 257/415 |
| 4-76960 | 3/1992 | Japan | 257/419 |
| 2151398 | 7/1985 | United Kingdom | 437/901 |

OTHER PUBLICATIONS

European Search Report for 95103971.8, issued May 2, 1996.

*Primary Examiner*—Michael Trinh
*Attorney, Agent, or Firm*—Lahive & Cockfield, LLP

[57] ABSTRACT

A semiconductor pressure sensor utilizes single-crystal silicon piezoresistive gage elements dielectrically isolated by silicon oxide from other such elements, and utilizes an etched silicon substrate with an etch stop. P-type implants form p-type piezoresistive gage elements and form p+ interconnections to connect the sensor to external electrical devices. The diaphragm is made from epitaxially-grown single-crystal silicon. Passivation nitride can be used for additional dielectric isolation. One practice of the invention provides over-range cavity protection, and thus increased robustness, by forming an over-range stop for the diaphragm through localized oxygen ion implantation and etching.

3 Claims, 5 Drawing Sheets

METHOD FOR MANUFACTURING A SEMICONDUCTOR PRESSURE SENSOR WITH SINGLE-CRYSTAL SILICON DIAPHRAGM AND SINGLE-CRYSTAL GAGE ELEMENTS

This application is a divisional application of Ser. No. 08/210,041 filed on Mar. 18, 1994, abandoned. The contents of all of the aforementioned application(s) are hereby incorporated by reference.

REFERENCE TO RELATED APPLICATION

This application is related to the following commonly-assigned application filed the same day herewith: U.S. patent application Ser. No. 08/210,422, for SEMICONDUCTOR PRESSURE SENSOR AND RELATED METHODOLOGY WITH POLYSILICON DIAPHRAGM AND SINGLE-CRYSTAL GAGE ELEMENTS (Attorney Docket No. FOM-019A), filed Mar. 12, 1994, now U.S. Pat. No. 5,589,810. The disclosure of the above-cited application is incorporated herein by reference.

BACKGROUND

This invention relates to semiconductor pressure sensors, and to improved methods for manufacturing such devices.

Semiconductor pressure sensors and strain gages are commonplace today. Their extremely small size, less than 0.125 inch in any dimension, is typical. High durability to outside forces makes these devices popular for the pressure measurement needs of hydraulic and aerodynamics forces, among other applications.

Typically, semiconductor pressure sensors contain a diaphragm of one or more silicon layers for deflecting in response to opposing pressure environments, and piezoresistive elements that are configured for sensing the direction and/or magnitude of diaphragm deflection.

The manufacture of these sensors makes the diverse range of devices available today and one aspect of the invention provides improvements in that manufacture. Because high temperature stability is often required, improvements relating to sensor heat stability is an active research area. Dielectric isolation is one technique which increases stability. The dielectric ideally isolates semiconductor piezoresistive elements from the diaphragm, the support structure, and other piezoresistive elements. Silicon dioxide, SiO2, exemplifies a known dielectric that maintains a nearly constant resistance over significant temperature changes.

The type of silicon used in the pressure sensor is also important. Single-crystal silicon and polycrystalline silicon materials have different properties that influence mechanical strength, sensitivity, and even manufacturability.

Despite the advances made in semiconductor physics, pressure sensors with improved temperature stability and higher pressure sensitivity are sought, particularly for use in hostile environments. Devices available today generally have limited sensitivity and dielectric isolation, that restrict stability and high temperature operation.

In U.S. Pat. No. 4,672,354 for "Fabrication of Dielectrically Isolated Fine Line Semiconductor Transducers and Apparatus", for example, glass is used as an insulator and as a bonding agent. Such a pressure transducer is difficult to manufacture, and has other undesirable characteristics.

With this background, an object of this invention is to provide improved semiconductor pressure sensors and associated manufacturing methods, and in particular, for uses which require high temperature stability and high sensitivity.

Another object of the invention is to provide a high sensitivity semiconductor pressure sensor which is easier to manufacture than competitive existing sensors.

A further object of this invention is to provide a semiconductor pressure sensor, and a related method of manufacture, for dielectrically isolating single crystal silicon sensors, and further for creating a controllable etch stop configuration for forming the diaphragm.

Other objects of the invention are evident in the description which follows.

SUMMARY OF THE INVENTION

The invention features, in one aspect, a semiconductor pressure sensor having a single-crystal silicon diaphragm and a supporting etched silicon substrate. A piezoresistive single-crystal gage element, doped with p-type implants, is disposed adjacent a first side of the diaphragm and is dielectrically isolated from other elements of the sensor by a silicon oxide layer formed by oxygen ion implantation. An electrical interconnection connects the gage element to external electronics. A further dielectric isolator, of passivating nitride, can provide protection from exposure to the environment.

Preferably, the silicon substrate and the oxygen ion implantation form a common silicon-on-insulator (SOI) wafer. Epitaxially grown single-crystal silicon on the SOI wafer forms the single-crystal silicon diaphragm and an additional surface-annealed silicon forms the piezoresistive gage element. The gage element is further isolated by the silicon oxide layer within the SOI wafer.

In other aspects, the piezoresistive gage element is mounted with a first side of the diaphragm, and the substrate is mounted with a second side of the diaphragm. This facilitates the manufacturing process and allows the substrate to be etched on a backside, away from the rest of the pressure sensor.

In yet another aspect, the invention features oxygen ion implantation for forming an etch stop, to control the etch thickness and to aid in the manufacturing process. Accordingly, the piezoresistive gage element is arranged adjacent a first side of the single-crystal silicon diaphragm and dielectrically isolated by an additional silicon oxide implantation. In this aspect, the substrate is adjacent the second side of the diaphragm, but separated from it by the silicon oxide implantation which forms the etch stop.

In still another aspect, the silicon oxide layer which forms an etch stop is confined within a localized, well-defined volume of the substrate. The silicon oxide region forms an etch stop during a first etch process, then the localized silicon oxide region is itself etched during a second etch process to form an over-range cavity support for protection of the sensor. The localized over-range cavity support region protects the diaphragm from extreme movements that would otherwise deform or rupture an unsupported diaphragm. The over-range region thereby prevents unacceptable diaphragm stress.

The invention also features methods for manufacturing semiconductor pressure sensors. According to one aspect, a silicon-on-insulator (SOI) wafer is provided to include a substrate, a silicon oxide implantation which functions as an etch stop, and surface annealed silicon. Epitaxial silicon is grown on the surface silicon to form a single-crystal silicon diaphragm with opposed first and second surfaces. The diaphragm is afterwards implanted by a second silicon oxide layer to form a dielectric isolator. The second silicon oxide layer is annealed to provide surface silicon for a piezoresistive gage element made of p-type implants. The piezoresistive gage element is formed within the surface annealed silicon by boron implantation and by etching to create a dielectrically isolated piezoresistive sensing element. It is preferably provided with additional dielectric isolation by nitride deposition. Evaporated metal, e.g., aluminum, is deposited and etched to provide an external electrical connection to the piezoresistive gage element. The substrate, as part of the SOI wafer, is then etched to provide a backside pressure port such that the diaphragm can deflect in response to a pressure difference between the first and second surfaces.

Alternatively, the silicon oxide implantation which forms the etch stop is confined to a localized and buried volume within the silicon substrate, to form both an etch stop and an over-range cavity support region. Oxygen ion implantation is implanted locally by masking portions of the silicon substrate. Once the buried implantation is complete, the substrate silicon is epitaxially grown to form a single-crystal silicon diaphragm and piezoresistive gage element, as above.

These and other features of a sensor according to the invention provide several advantages. In particular, the dielectric isolation of the silicon oxide layer provides the sensor with high operating stability and high temperature capability, and also provides an etch stop for backside etching of the pressure port. By using single-crystal silicon as the piezoresistive gage elements, the sensor provides relatively high sensitivity and low pressure differentials, and is relatively easy to manufacture. This enables the device to be coupled more effectively with digital electronics, with the potential for solving other high-performance, intelligent pressure transmitter needs. Further, the cavity formed by localized oxygen implantation and etching provides an over-range stop for the diaphragm, resulting in high robustness.

These and other aspects will become apparent in the following description.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENT

Figure 1:
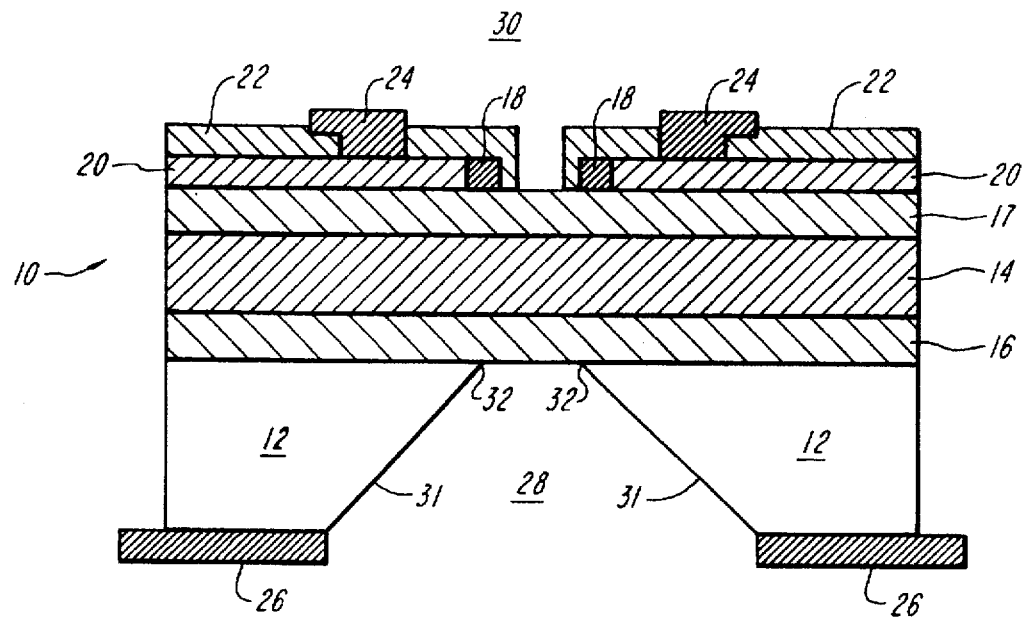
FIG. 1 is a cross-sectional view of a semiconductor pressure sensor constructed in accordance with the invention.
Figure 1A:
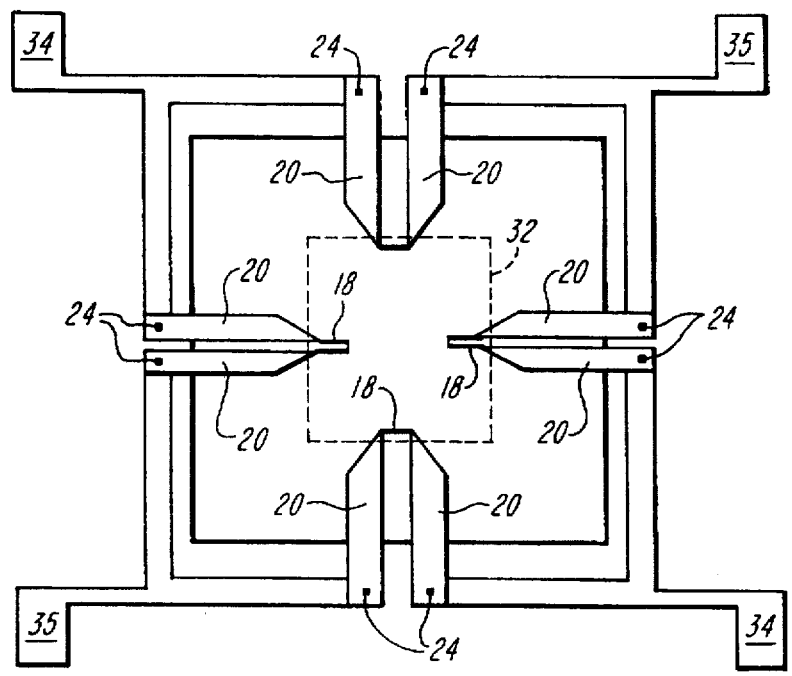
FIG. 1A is a schematic top view of the pressure sensor of FIG. 1.
Figure 2:
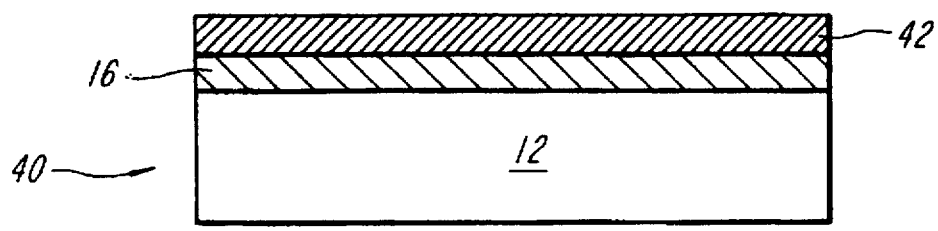
FIG. 2 is a cross-sectional view of an illustrative silicon-on-insulator (SOI) wafer for the fabrication of the sensor of FIG. 1.
Figure 2A:
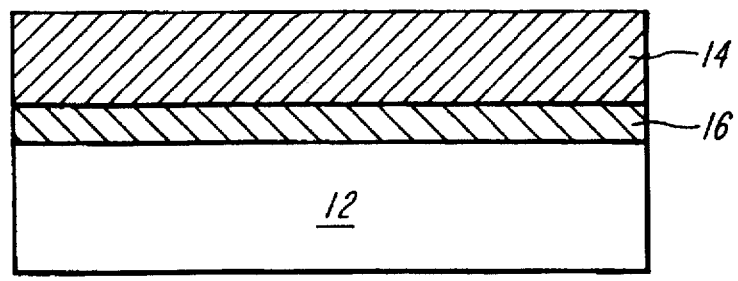
FIG. 2A shows the SOI wafer of FIG. 2 with epitaxially grown silicon to create a single-crystal silicon diaphragm.
Figure 2B:
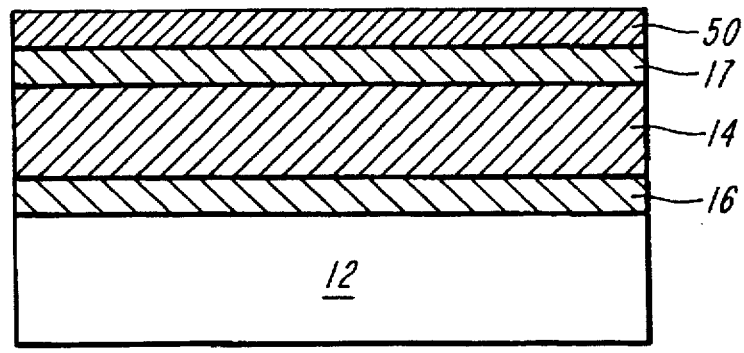
FIG. 2B shows the wafer of FIG. 2A with additional oxide implantation and surface annealed silicon.
Figure 2C:
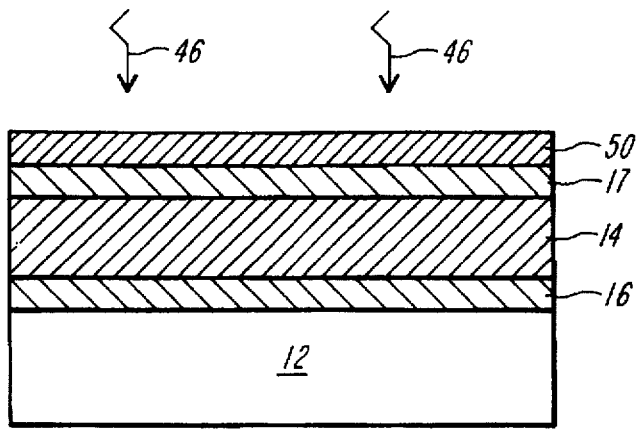
FIG. 2C shows the wafer of FIG. 2B implanted selectively with boron ions to create p-type regions as sensing resisters and p+regions for interconnection.
Figure 2D:
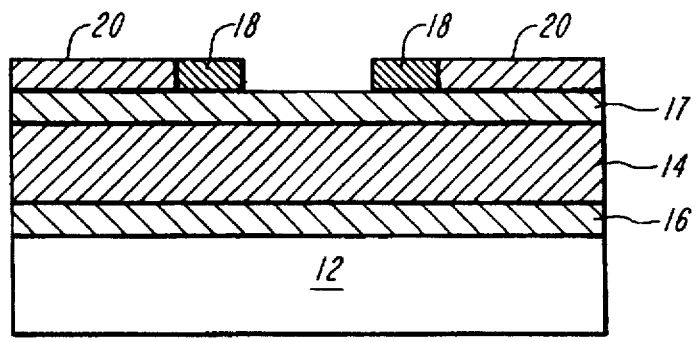
FIG. 2D shows the wafer of FIG. 2C after etching to form p+interconnections and p-type sensing resistors.
Figure 2E:
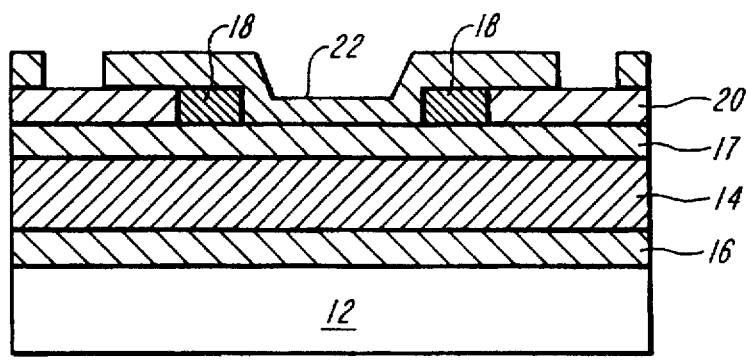
FIG. 2E shows the wafer of FIG. 2D with an additional nitride deposition and etching.
Figure 2F:
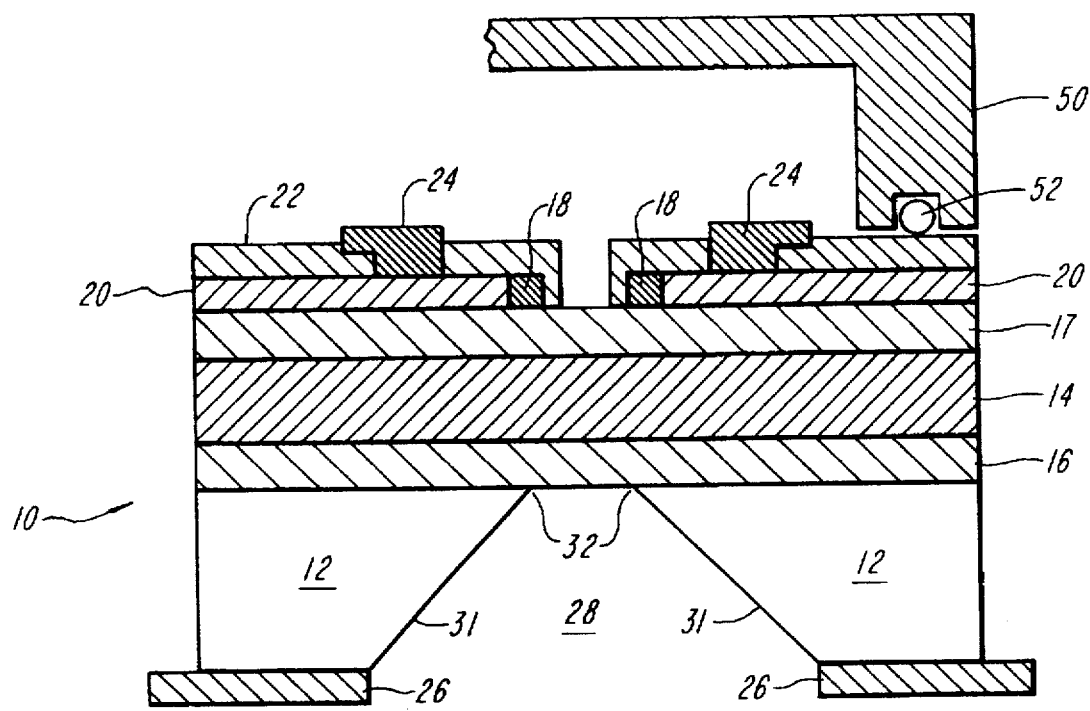
FIG. 2F schematically illustrates in a cross-sectional side view the pressure sensor of FIG. 1 in an etching fixture for etching the silicon substrate.

Generally, FIGS. 1 and 1A show a semiconductor pressure sensor 10 constructed in accordance with the invention; and FIGS. 2-2F illustrate the manufacturing stages to fabricate the sensor 10 beginning with a common silicon-on-insulator (SOI) wafer.

In particular, the sensor 10 has a single-crystal diaphragm 14 made of epitaxially grown single-crystal silicon disposed between single-crystal p-type gage elements 18 and a silicon substrate 12. The substrate 12 includes a localized region of oxygen ion implantation to form a silicon oxide layer 16, which functions as a dielectric isolator and as an etch stop for when the substrate 12 is etched to form the pressure port 32. The single-crystal silicon diaphragm 14 is disposed between the oxide layer 16 and another oxide layer 17. Layer 17 serves as a dielectric isolator to isolate one gage element 18 from other gage elements 18, and from the diaphragm 14 and the substrate 12. The sensor 10 is annealed and implanted with boron ions, in selected localized regions, and selectively etched, to form the gage elements 18 as p-type gage piezoresistors and p+interconnections 20. A nitride deposition layer 22 preferably passivates the p-type piezoresistors 18. Metal contacts 24 provide electrical communication to the p+interconnections 20 and provide a way to externally connect the sensor 10 to a further electrical device.

The electrical signals produced at the metal contacts 24 are an indication of the pressure differential across the diaphragm 14, i.e., between pressure environments 28 and 30. More particularly, the electrical signals at the contacts 24 are produced by the p-type gage elements 18 and are indicative of a resistance change functionally dependent upon the stress of the diaphragm 14. The etched portion 31 of the substrate 12 defines a pyramidal pressure port 32, which exposes the diaphragm 14 to the pressure environment 28, and the substrate 12 supports the sensor 10 at a header interface, e.g., at the mounting headers 26.

Figure 3:
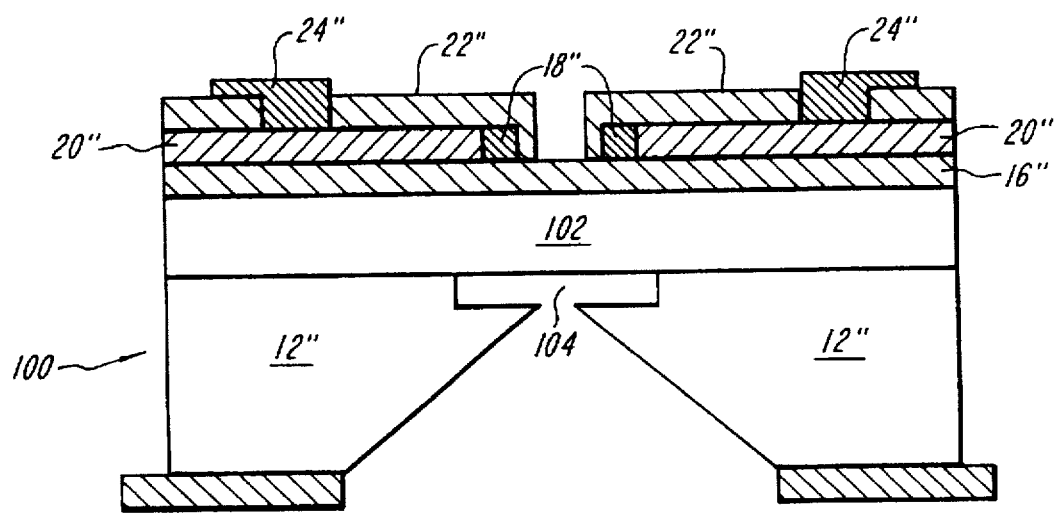
FIG. 3 illustrates a cross-sectional view of another embodiment of a pressure sensor constructed in accordance with the invention.

The FIG. 1 showing of the pressure sensor 10, and the similar drawings in FIGS. 2-3, contain exaggerated proportions for clarity of illustration. For example, the silicon oxide layer 16, FIG. 1, is typically 0.45 micron thick, and the etched piezoresistive gage elements 18 are typically 0.4 micron thick.

FIG. 1A is a diagrammatic top view (not to scale) of the sensor 10 of FIG. 1, showing the p+interconnections 20 and the p-type piezoresistive elements 18. The gage elements 18, which preferably inter-connect and form a conventional Wheatstone bridge configuration at the inner ends of the p+interconnections 20, are located over the edges of the pressure port 32, as defined by the edge of the substrate silicon etched portion 31 (FIG. 1). The metal contacts 24, for connecting the sensor 10 to an external electronic device, are located at the outer ends of the p+interconnections 20. A disturbance to this bridge circuit, caused by pressure-induced diaphragm deflection, provides a measurable voltage signal at the contacts 24.

In order to produce maximal additive read-out of diaphragm movement, the gage elements 18 are preferably oriented in a push-pull configuration. In this configuration, each of the elements 18 is oriented relative to the edge of the diaphragm 14 that is nearest to the element, with two of the elements 18 arranged perpendicular to the edge, and the other two elements arranged parallel to the edge.

The sensor 10 can include aluminum bond pads 34, 35 which, for clarity of illustration, are only shown in FIG. 1A. These pads connect electrically to the contacts 24 and provide a durable and convenient forum for connecting external electronics, e.g., wires, to the sensor to acquire the electrical signal from the semiconductor interconnections 20. Typically, the pads 34 are connected to a voltage source, and the pads 35 provide a measurement signal indicative of pressure on the diaphragm 14.

FIG. 2 illustrates a general silicon-on-insulator (SOI) wafer 40 that has a silicon substrate 12 implanted with oxygen ions to create a buried silicon oxide layer 16 which typically is approximately 0.45 micron thick. Ion implantation is a known process and usually includes an ion source, focusing elements, an acceleration tube and a mass analyzer. The silicon oxide layer 16 can be formed very precisely with known technologies and forms a dielectric isolator which inhibits leakage between subsequently-formed piezoresistive gage elements. A single-crystal silicon layer 42 is formed on the silicon oxide layer 16 by an annealing process, also well known, to a thickness typically of approximately 0.2 to 0.4 micron. Surface silicon annealing typically occurs over one to two hours in a dry nitrogen environment at a temperature over 1000° C.

The SOI wafer 40 of FIG. 2, formed by oxygen ion implantation and annealing, is commercially available. The SOI structure provides improved dielectric isolation when combined with further features of the invention. Further, the practice of the invention is not limited to the implanted silicon oxide layer 16 of FIGS. 1, 1A and 2; other silicon oxide forms are acceptable as dielectric isolators.

To fabricate the sensor 10 of FIG. 1 from the wafer 40 of FIG. 2, and as shown in FIG. 2A, the surface silicon layer is grown to an additional thickness of approximately one to fifteen microns with epitaxial single-crystal silicon to form the diaphragm 14. After the desired diaphragm thickness is achieved, the wafer of FIG. 2A is again implanted with oxygen ions to form a silicon oxide implantation 17, and annealed to create surface silicon 50, as shown in FIG. 2B.

The SOI wafer of FIG. 2B is selectively doped with boron ions 46, as illustrated in FIG. 2C, at the single-crystal silicon surface layer 50, to prepare for the formation of p-type piezoresistive gage elements and of p+interconnections. The piezoresistive gage elements 18 and interconnections 20 are formed by etching the doped single-crystal silicon, as illustrated in FIG. 2D. Preferably, but not required, nitride deposition forms a passivation layer 22, as shown in FIG. 2E. The passivation layer 22 is functionally used to electrically insulate the p-type gage elements 18 from other elements of the sensor 10 (FIG. 1). Selective etching of the layer 22 provides access for the contact 24 shown in FIG. 2F.

FIG. 2F illustrates a final step in the illustrated embodiment for producing the sensor 10 of FIG. 1. In particular, the silicon substrate 12 is etched with an appropriate etchant at the illustratively pyramidal etch region 31, while the front of the sensor, e.g., the gage elements 18 are protected from the etchant by a conventional fixture 50, illustrated as having an O-ring interface seal 52. The metals contact 24 are formed by evaporated aluminum deposition and etching on each p+interconnection 20. Other high temperature metals can also be used for the interconnections.

Alternative to the embodiment described above, the sensor 10 of FIG. 1 can exclude the step of implanting the silicon oxide layer 16, and can form the pressure port 32 by controlled etchant timing. According to this alternative embodiment, the SOI wafer of FIG. 2 is implanted with boron ions, similar to the FIG. 2B description, to create p-type gage elements 18 and p+interconnections 20. Epitaxial single-crystal silicon is grown directly on the substrate to form a diaphragm portion, whereafter the substrate is etched by controlled timing to the epitaxial silicon layer. The resultant sensor has the same structure as shown in FIG. 1, except it lacks the isolation layer 16, and has the same electrical representation as shown in FIG. 1A.

Figure 3A:
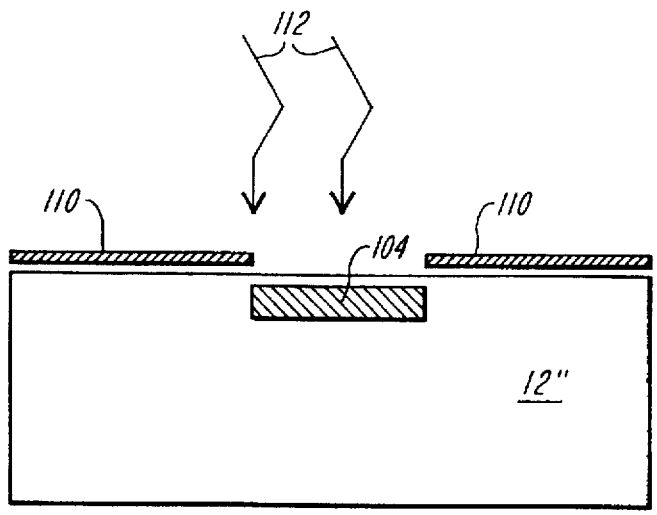
FIG. 3A shows a cross-sectional view of a silicon substrate wafer with external masking to produce a localized, buried silicon oxide volume.
Figure 3B:
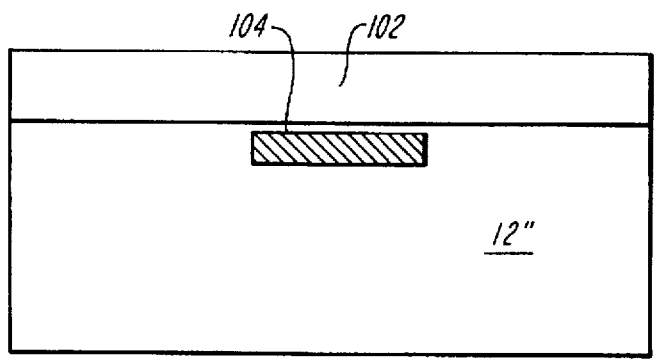
FIG. 3B shows the wafer of FIG. 3A with additional epitaxial silicon growth.
Figure 3C:
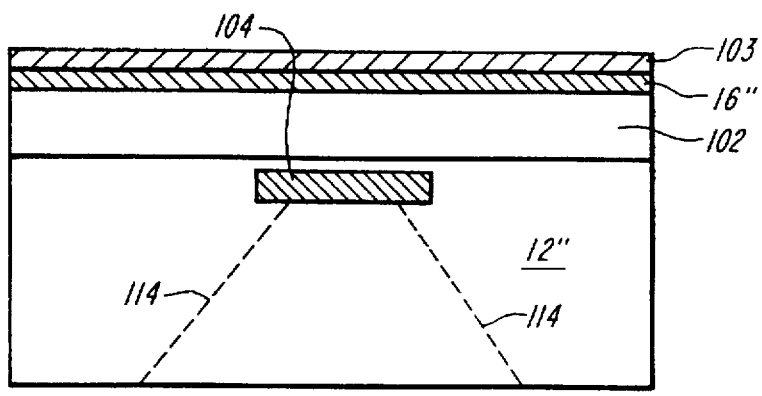
FIG. 3C shows the wafer of FIG. 3B with additional oxygen ion implantation and annealing to create a silicon oxide dielectric layer with surface silicon.

A sensor 100 shown in FIG. 3 illustrates another embodiment in accordance with the invention. FIGS. 3A–3C illustrate steps to manufacture the sensor 100.

An etched substrate 12" forms both a diaphragm 102 and an over-range cavity protection region 104 in the sensor 100. The diaphragm 102 has a dielectric silicon oxide implantation layer 16" to isolate one piezoresistive gage element 18" from other elements of the sensor 100. P+ interconnections 20" are given electrical passage to areas external to the sensor 100 via metal contacts 24". Preferably, a nitride deposition 22" passivates the gage elements 18", providing additional dielectric isolation.

The over-range cavity protection region 104 is created by forming a localized volume of silicon oxide, as illustrated in FIG. 3A, with a depth of approximately 0.5 to 1 micron by ion implantation. A metal mask 110 shields the substrate 12" while oxygen ions 112 are focused at the over-range region 104. Then, as shown in FIG. 3B, epitaxial single-crystal silicon is grown on the surface silicon area, which is part of the substrate 12", and above the over-range cavity protection region 104. The diaphragm 102 is implanted with oxygen ions and annealed to form a dielectric silicon oxide layer 16", shown in FIG. 3C, and a surface silicon layer 103, which is selectively doped with boron ions for the gage elements 18" and for the p+ interconnections 20" of FIG. 3. Etchant, e.g., potassium hydroxide, is used to remove the silicon of the base substrate 12", within a pyramidal volume bounded by dashed lines 114 of FIG. 3C, up to the stop created by the localized silicon oxide volume at the over-range cavity protection region 104. Another etchant, e.g., hydrofloric acid, is then used to remove the silicon oxide localized volume, creating an over-range cavity protection region 104. Over-range cavity protection helps to ensure that the diaphragm is not over-stressed between extreme pressure environments; i.e., if the diaphragm 102 is subjected to a pressure differential that would over-stress it, the deflected diaphragm abuts the substrate 12" at the over-range cavity protection region 104, thereby avoiding damaging, over-defection.

Preferably, the metal contacts 24" of FIG. 3 are connected to lead-out pads, e.g., the aluminum bond pads 34, 35 of FIG. 1A, to assist in external packaging and connection to the sensor 100.

Those skilled in the art will appreciate that modifications to the above description, and to the illustrated structures and procedures can be made without departing from the spirit and scope of the invention. For example, the sensor 10 of FIG. 1 is readily configured to external lead-out pads, and connected to a Whetstone bridge configuration as is well-known to those skilled in the art. Further, and without limitation, layer thicknesses and multiple oxygen ion implantations, as illustrated in FIGS. 1–3, can be changed or implemented through a variety of means known in the semiconductor fabrication art.

It is thus seen that the invention efficiently attains the objects set forth above, among those apparent in the preceding description. In particular, the invention provides a high sensitivity semiconductor pressure sensor with relatively high temperature stability. It also provides sensors with etch stop capability and with over-range cavity protection, and it provides sequences of steps for the manufacture of such sensors.

It is accordingly intended that all matter contained in the above description or shown in the accompanying drawings be interpreted as illustrative, rather than as limiting.

It is also understood that the following claims are to cover all specific and genetic features of the invention as described herein, and all the statements of the scope of the invention.

Having described the invention, what is claimed as new and secured by Letter Patent is:

1. A method for manufacturing a semiconductor pressure sensor, said method comprising the successive steps of (A) providing a silicon-on-insulator wafer, said wafer including a silicon substrate, a first silicon oxide implantation for forming an etch stop, and a first surface annealed silicon, (B) epitaxially growing additional single-crystal silicon on said first surface silicon for forming a diaphragm with opposing first and second surfaces, (C) implanting oxygen ions in said additional single-crystal silicon for forming a dielectric isolator, (D) annealing said implanted additional single-crystal silicon thereby forming a second surface silicon on said dielectric isolator, (E) forming a dielectrically isolated single-crystal silicon piezoresistive gage element in said second surface silicon by boron ion implantation and etching, (F) forming an external connector by metal evaporation and etching, said external connector being in circuit with said gage element for providing an external electrical connection to said sensor, and (G) etching said substrate to said etch stop such that said diaphragm can deflect in response to a pressure difference between said first and second surfaces.

2. A method according to claim 1 comprising the further step of depositing passivation nitride on said piezoresistive gage element, after said step of forming a dielectrically isolated single-crystal piezoresistive gage element, for providing additional dielectric isolation of said gage element.

3. A method according to claim 1, wherein said first silicon oxide implantation is confined to a localized volume in said substrate, and comprising the further steps of etching said first silicon oxide implantation at said localized volume for forming an over-range cavity protection region.

* * * * *